United States Patent [19]

von Keudell et al.

[11] Patent Number: 5,709,393
[45] Date of Patent: Jan. 20, 1998

[54] TOOL BIT CHUCK FOR DRILLING AND CHISELING BITS

[75] Inventors: Leopold von Keudell, Eching; Klaus Nagelschmied, Germering, both of Germany; Bernhard Plunger, St. Anton, Austria

[73] Assignee: Hilti Aktiengeschaft, Schaan, Liechtenstein

[21] Appl. No.: 722,285

[22] Filed: Sep. 27, 1996

[30] Foreign Application Priority Data

Sep. 28, 1995 [DE] Germany .............. 195 36 154.7

[51] Int. Cl.⁶ ............................... B23B 31/107
[52] U.S. Cl. ............... 279/97; 279/82; 279/78; 408/240
[58] Field of Search ............... 279/50, 57, 65, 279/74, 75, 82, 77, 78, 97, 904, 905, 69; 408/239 R, 239 A, 240

[56] References Cited

U.S. PATENT DOCUMENTS

| | | | |
|---|---|---|---|
| 2,913,263 | 11/1959 | Zajac | 403/325 |
| 4,701,083 | 10/1987 | Deutschenbaur et al. | 279/97 |
| 5,000,631 | 3/1991 | Deutschenbaur et al. | 279/82 |
| 5,447,397 | 9/1995 | Asano | 279/82 |

FOREIGN PATENT DOCUMENTS

| | | | |
|---|---|---|---|
| 1135267 | 8/1962 | Germany | 279/904 |
| 3605970 | 8/1987 | Germany | 279/905 |
| 3744092 | 7/1989 | Germany | |

*Primary Examiner*—Steven C. Bishop
*Attorney, Agent, or Firm*—Anderson Kill & Olick, P.C.

[57] ABSTRACT

A tool bit chuck for drilling and chiseling bits has an axially extending receiving sleeve (1) with an opening (3) therethrough in which latching elements (9) are radially displaceably supported. The latching elements (9) are radially displaceable by a spring loaded axially displaceable actuating element (10). An actuating sleeve (12) laterally encloses and is axially displaceable relative to the receiving sleeve (1). Connecting members fix (6, 13) the actuating sleeve to the receiving sleeve. The actuating sleeve (12) has a stop (14) cooperating with the actuating element (10) for applying an axial force to the actuating element for assisting in centering the drilling or chiseling bit.

8 Claims, 2 Drawing Sheets

TOOL BIT CHUCK FOR DRILLING AND CHISELING BITS

BACKGROUND OF THE INVENTION

The present invention is directed to a tool bit chuck for drilling and chiseling bits and has an axially extending receiving sleeve laterally enclosed by an actuating sleeve. An annularly shaped actuating member acted on by a spring member is located with the actuating sleeve and outwardly of the receiving sleeve. The actuating element cooperates with at least one latching element which can be shifted into a conically shaped receiving passageway in the receiving sleeve. The receiving sleeve has at least one side through opening in the region of the receiving passageway in which the latching member is supported so that it can be displaced radially.

A tool bit chuck is disclosed in EU-PS 0 175 088 and includes a receiving sleeve and an annular shaped actuating member acted on by a spring element for displacing two locking elements into a conically shaped receiving passageway. An actuating sleeve is axially displaceable relative to the receiving sleeve and the receiving sleeve has two side openings in the region of the conically shaped receiving passageway in which the locking members are supported so that they can be displaced radially.

The side openings are shaped as radial slots inclined in the axial direction and open into the receiving passageway and to the outer surface of the receiving sleeve. The side openings are disposed tangentially to the receiving passageway. These radial slots are inclined so that their openings at the outer surface of the receiving sleeve are directed towards the rear region of the receiving sleeve.

The receiving sleeve has a stop in its rear region in the form of an annular shoulder facing the front end of the receiving sleeve and the annular shoulder serves as an abutment for the spring element cooperating with the actuating element.

If a conically shaped chucking shank of a drilling or chiseling bit is inserted into the receiving passageway, the latching members are displaced radially inwardly, and the spring member is pre-stressed. When the shank rests in the inside surface of the receiving passageway, a circumferentially arranged groove on the chucking shank registers with the mouth region of the openings in the receiving sleeve so that the latching members can engage into this groove.

Since the actuating sleeve must be moved in the axial direction manually towards the rear end region of the receiving sleeve, so that the drilling or chiselling tool bit can be unlatched, the spring force cannot be very large.

As a result, only a limited axial force can be exerted by the spring element which pulls the chucking shank into the conically shaped receiving passageway of the chuck.

Such axial force is exceeded by the weight of the tool bit chuck or by an elasticity of a seal in the end region of the receiving passageway. The conically shaped surface of the chucking shank thus no longer rests at the internal surface of the conically shaped receiving passageway whereby the centering of the shank is limited in the receiving passageway.

SUMMARY OF THE INVENTION

Therefore, the primary object of the present invention is to improve the centering of the drilling or chiselling bit in a tool bit chuck, so that effective concentric running is assured.

In accordance with the present invention, an actuating sleeve comprising a stop cooperates with an actuating element, and means for interconnecting the actuating sleeve and the receiving sleeve are provided on the two sleeves.

An additionally axially directed force can be applied to the actuating element supplementing the axial force provided by the spring element by providing a stop at the actuating sleeve. This additional axially directed force acts on the latching members in an amplified manner, so that they press the clamping shank into the receiving passageway. This arrangement affords a better centering action and effective concentric running of the drilling or chiseling bit. The means connecting the receiving sleeve and actuating sleeve prevent the detachment of the stop while the tool works on a receiving material.

During use of the tool, shock loads of different magnitude can arise and they are transmitted to the stop of the actuating sleeve through the chucking shank of the drilling or chiselling bit, the latching members and the actuating element. To prevent damage to the connecting means acting between the receiving sleeve and the actuating sleeve, a damping element is preferably arranged between the stop and the actuating element. The damping element can be formed of an elastic ring made of rubber.

For design reasons, preferably the stop is formed as an annular shoulder at an inner surface of the actuating sleeve.

Shocks occurring during working act on the tool bit chuck counter to the working direction. The stop acting on the actuating element is preferably arranged on the actuating element in a region spaced from the mouth of the receiving passageway and is directed towards the mouth of the receiving passageway, so that the displacement of the latching members can be counteracted.

The means connecting the receiving sleeve and the actuating sleeve are formed as threads for manufacturing and economic reasons. The threads extend along a short length of the tool bit chuck and are disposed either in the front or rear regions of the receiving sleeve and the actuating sleeve. The threads cooperate when the stop on the actuating sleeve cooperates with the actuating element. Otherwise the threads do not mesh and the actuating sleeve can be moved axially relative to the receiving sleeve without turning the actuating sleeve relative to the receiving sleeve.

In tool bit chucks where the receiving sleeve has side openings and form inclined radial slots, the latching members are preferably shaped as pins which project at their ends beyond the outer surface of the receiving sleeve. The actuating element can engage in the region of the pins projecting beyond the outer surface of the sleeve. Thus the actuating element is axially displaced if there is axial movement of the latching members.

In tool bit chucks where the receiving sleeve has side openings in the form of elongated slots, preferably the latching elements are designed as pawls. The elongated slots correspond basically to the outside surface of the latching elements and serve for receiving and guiding the latching elements.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
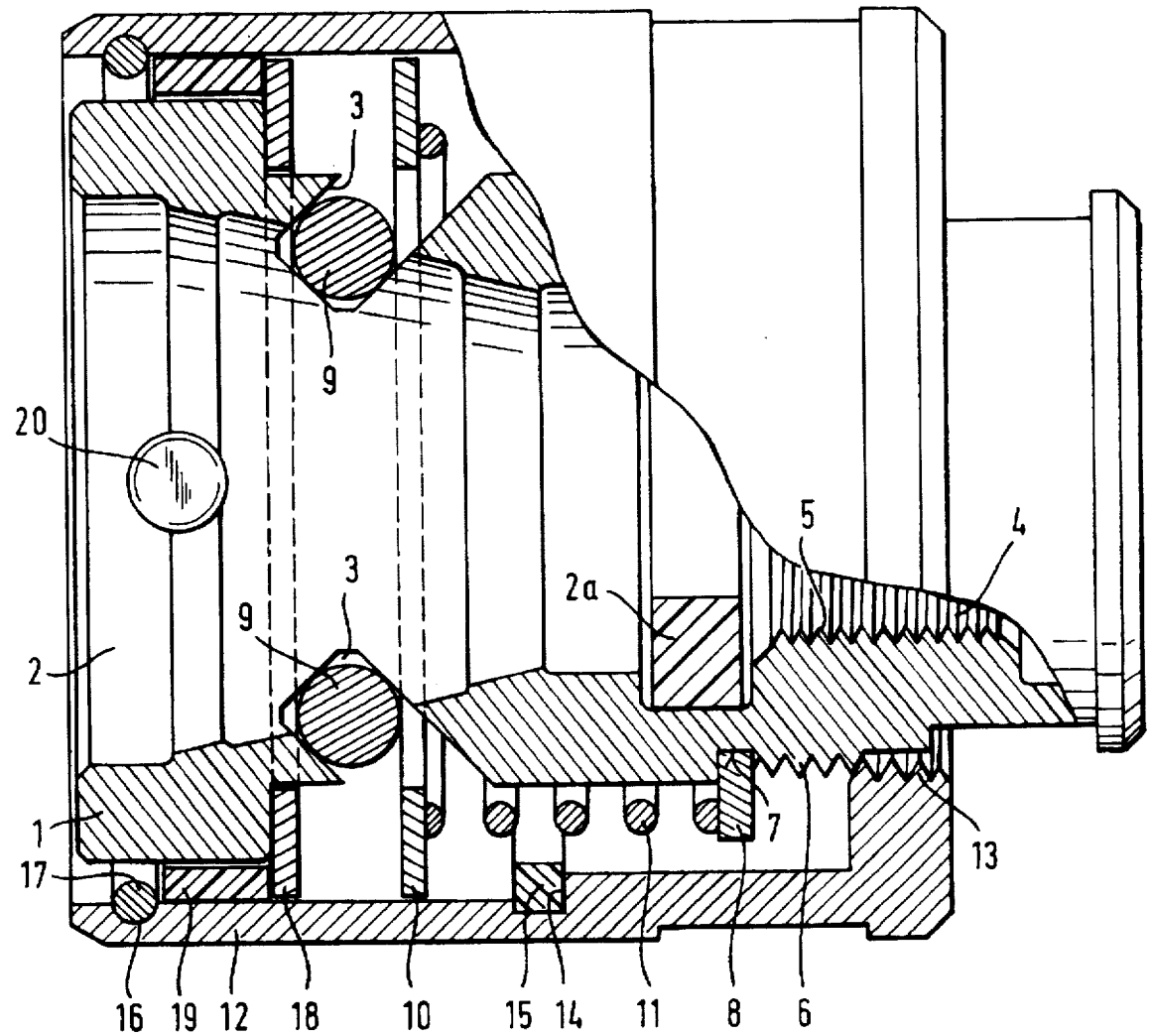
FIG. 1 is an elevational view of a tool bit chuck embodying the present invention shown partly in section and containing pin shaped latching elements.
Figure 2:
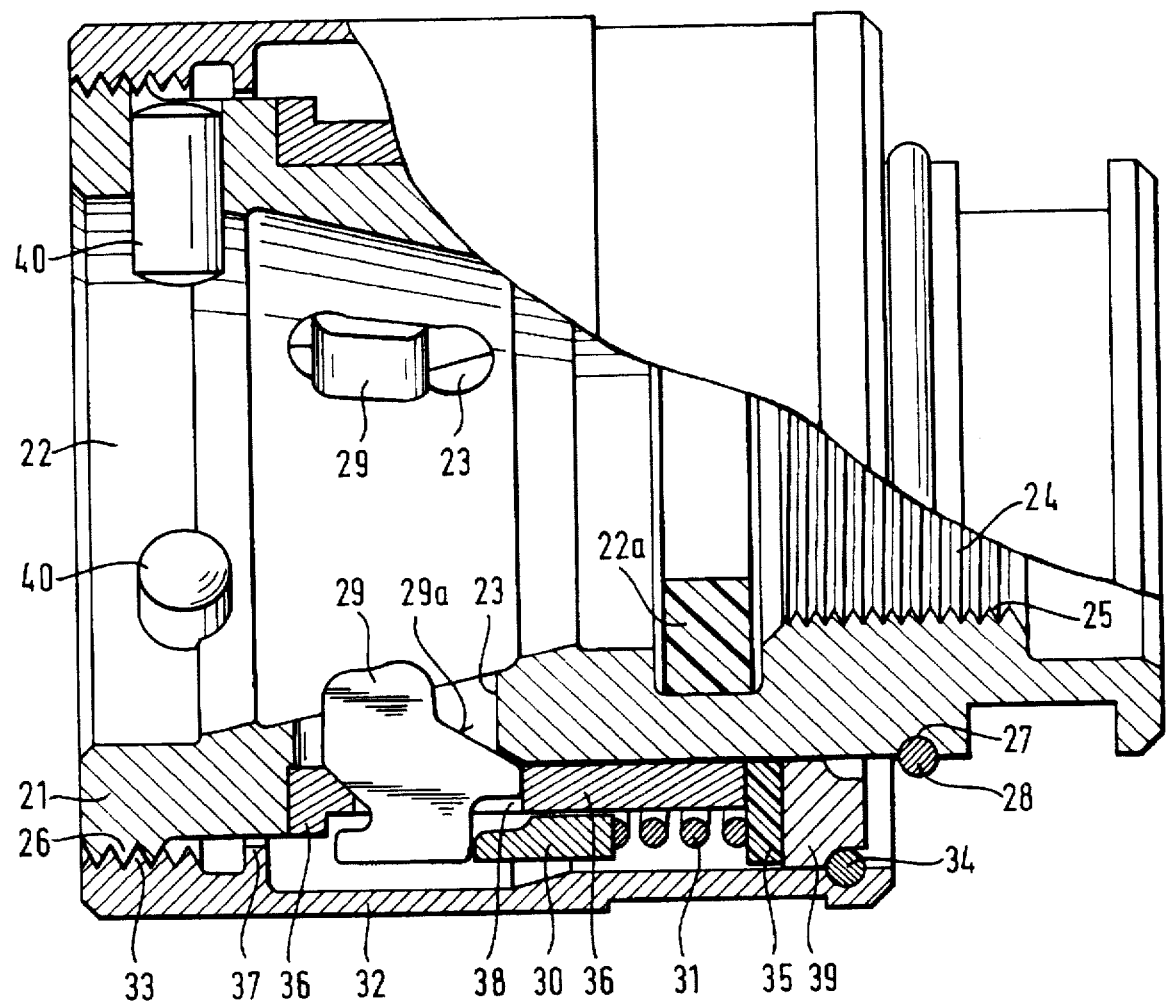
FIG. 2 is a view similar to FIG. 1 of a tool bit chuck embodying the present invention, however, with pawl-like latching elements.

In FIGS. 1 and 2 a tool bit chuck is illustrated formed of an axially extending receiving sleeve 1, 21 with several latching elements 9, 29 and an annular shaped actuating member 10, 30 located on around the exterior of the receiving sleeve. In addition, an axially extending spring element 11, 31 is located around the outside of the receiving sleeve and an axially extending actuating sleeve 12, 32 is located around the receiving sleeve and outwardly of the actuating element and the spring.

The receiving sleeve 1, 21 has an axially extending central passageway formed as a conically shaped receiving passageway 2, 22 extending from its mouth region, that is the left end in FIGS. 1 and 2 towards the right end. At the rear end of the passageway 2, 22, there is a receiving bore 4, 24 equipped with an internal thread 5, 25. An annular elastic damper 2a, 22a, is located towards the rear of the receiving sleeve, 121 between the receiving passageway 2, 22 and the receiving bore 4, 24. The receiving sleeve 1,21 has several side through openings 3, 23 in the region of the conically shaped receiving passageway 2, 22 and the openings serve for holding latching elements 9, 29. The through openings 3, 23 are arranged equiangularly around the circumference of the receiving passageway 2, 22.

The actuating sleeve 12, 32 partially laterally encloses the receiving sleeve 1, 21 and is axially displaceable relative to the receiving sleeve. The annular actuating element 10, 30, cooperating with the latching elements 9, 29 and also displaceable relative to the receiving sleeve 1, 21, is located within the actuating sleeve.

In FIG. 1 the tool bit chuck is shown without an inserted tool bit and the receiving sleeve 1 has connecting means 6 in the form of an outside thread at its rear end region. The thread 6 cooperates with a connecting means 13 on the actuating sleeve 12 formed as an inside thread. The inside thread 13 is located in the rear end region of the actuating sleeve 12. The receiving sleeve 1 has a circumferentially extending groove 7 located in its outside surface between the outside thread 6 and the through openings 3, and the groove 7 holds a stop element 8 in the form of a snap ring. The stop element 8 serves as an axial abutment for the spring element 11 cooperating with the actuating element 10. The through openings 3 located in the region of the conically shaped receiving passageway 2 are formed as radial slots disposed tangentially to the receiving passageway 2 and open towards the outer surface of the receiving sleeve 1 and also open into the receiving passageway 2.

Latching elements 9 in the form of pins are seated in the openings 3. The ends of the pins 9 extend beyond the outer surface of the receiving sleeve.

A stop 14, in the form of a circumferentially extending annular shoulder, is located in the inside surface of the actuating sleeve 12 with the annular shoulder facing the mouth of the conically shaped receiving passageway 2. An annular damping element 15 is retained at the annular shoulder by a positively locked connection with the actuating sleeve 12. Directly ahead of the annular shoulder or stop 14, that is in the direction between the actuating element 10 and the annular shoulder, a circumferentially extending recess is provided at the inside surface of the actuating sleeve 10 into which the damping element 15 is secured.

If the chucking shank of a drilling or chiseling bit, not shown, is inserted into the receiving sleeve 1, an essentially radially movement of the pin shaped latching elements 9 takes place. Accordingly, the spring element 11 is prestressed. If the chucking shank rests at the inside surface of the receiving passageway 2, a circumferentially arranged groove on the shank registers with the through openings 3 in the region of the inside surface of the receiving passageway, so that the pin shaped locking elements 9 can engage in the groove. The spring element 11 is then partially unloaded.

To fix the latching elements 9 into the groove in the chucking shank, the actuating sleeve 12 can be turned relative to the receiving sleeve 1 with the internal thread on the actuating sleeve turning relative to the external thread on the receiving sleeve, so that it is axially displaced into a latched position. In the latched position, the annular shoulder 14 of the actuating sleeve 12 is located at the actuating element 10 with the interposition of the annular shaped damping element 15.

To remove a drilling or chiseling bit, not shown, from the tool bit chuck, the actuating sleeve 12 must be returned to its original position, so that the annular shoulder 14 is spaced from the actuating element 10. An essentially radial displacement of the latching elements 9 into the release position is achieved by means of an annular stop element 17 located in the front region of the inside surface of the actuating sleeve 12o If the actuating sleeve 12 is displaced rearwardly relative to the receiving sleeve, the entrainment of the latching elements 9 occurs due to the annular shaped entrainment disk 18 located between the stop element 17 and the latching elements 9. In the release position, the latching elements 9 no longer project into the receiving passageway 2 of the receiving sleeve 1. The stop element 17 is formed by a flexible ring having a circular cross-section which engages in a circumferentially extending recess 16 in the inside surface of the actuating sleeve 12.

A damping ring 19 is located between the entrainment disk 18 and the stop element 17. An entrainment element 20 is located in the mouth region of the receiving passageway 2 and the entrainment element 20 is shaped as a pin projecting radially into the receiving passageway 2.

in FIG. 2 the receiving sleeve 21 of the tool bit chuck has a connecting means 26 in the form of an outside thread in the front end region of the receiving sleeve which cooperates with connecting means 33 in the form of an internal thread formed in the actuating sleeve 32. The internal thread 33 is located in the front end region of the actuating sleeve 32. The receiving sleeve 21 has a circumferentially extending groove 27 in its rear end region, that is the right hand end as viewed in FIG. 2 into which a stop element 28, in the form of a snap ring, projects. Stop element 28 serves along with an axially displaceable backup ring 39, movable relative to the receiving sleeve 21 and extending around the receiving sleeve, for axial abutment with the spring element 31 cooperating with the actuating element 30. An annular damping element 35 is located between the backup ring 39 and the spring element 31.

An axially displaceable bearing sleeve 36 is located between the actuating element 30 and the receiving sleeve 21 and the bearing sleeve serves for receiving and guiding the latching elements 29. Latching elements 29 are supported in corresponding side through openings 38 in the bearing sleeve 36 which register with the side through openings 23 in the receiving sleeve 21. The latching elements 29 have an irregular hook-like shape and a latching region cooperating with the bearing sleeve 36, the actuating element 30 and the mouth region of the side openings 23 at the outside surface of the receiving sleeve 21. Axial displacement of the latching elements 29 occurs when the backup ring 39 and the bearing sleeve 36 are displaced axially. The latching elements 29 extend through the side openings 38 and are pivotally suspended in the front region of the bearing sleeve 36. An inclined surface 29a of the latching elements 29 facing in the rearward direction of the receiving sleeve abuts the mouth region of the side openings 23 in the receiving sleeve in the course of axial displacement of the latching elements 29. In this way, the latching elements 29 are displaced radially outwardly so that the latching elements no longer project into the receiving passageway 22 of the receiving sleeve 21.

If the chucking shank of a drilling or chiselling bit, not shown, is inserted into the receiving passageway 22 then there is an essential radial displacement of the latching elements. 29. The spring element 31 is prestressed. When the chucking shank rests at the inside surface of the receiving passageway 22 a circumferentially extending groove at its insertion end registers with the through openings 23 of the receiving sleeve 21 as well as the through openings 38 of the bearing Sleeve 36, whereby the latching elements can engage into this groove. When this occurs, the spring element 31 is somewhat unloaded.

The actuating sleeve 32 can be rotated so that its internal thread moves relative to the external thread in the receiving sleeve 21 and can be moved axially forwardly into a latching position to retain the latching elements 29 in the groove of the chucking shank. Stop 34 in the form of an annular flexible ring is located in the inside surface of the rear region of the actuating sleeve and is seated in a circumferentially extending recess in the actuating sleeve. In the latched position, the stop 34 presses against the spring element 31, so that the spring element is strongly prestressed. The spring element 31 presses on the latching elements 29 so that they are secured in the receiving passageway 22 of the receiving sleeve 21 and into the groove of the chucking shank inserted into the receiving passageway. An annular damping element 35 is positioned between the backup ring 39 and the spring element 31.

To remove a drilling or chiselling bit, not shown, from the tool bit chuck, the actuating sleeve 32 must be returned to its original position, so that the stop 34 no longer presses against the spring element 31. A basically radial displacement of the latching elements 29 into their release position is accomplished, when the actuating sleeve 32 is moved rearwardly relative to the receiving sleeve by means of a stop element 37 disposed in the front region of the inside surface of the actuating sleeve 32. The latching elements 29 are entrained by the annularly shaped stop element 37 in the form of a disk shaped collar located at the inside surface of the actuating sleeve 32. In the release position, the latching elements do not project into the receiving passageway 22 of the receiving sleeve 21.

Three equiangularly distributed pin shaped rotary entrainment elements 40 are located in the mouth region of the receiving passageway 22 and these entrainment elements project radially into the receiving passageway.

While specific embodiments of the inventions have been shown and described in detail to illustrate the inventive principles, it will be understood that the invention may be embodied otherwise without departing from such principles.

What is claimed is:

1. Tool bit chuck for drilling and chiseling bits comprises an axially extending receiving sleeve (1, 21) forming an axially extending conically shaped receiving passageway (2, 22) with at least one opening (3, 23) extending through said receiving sleeve transversely of the axial direction thereof, an annular shaped actuating element (10, 30) encircles said receiving sleeve, a spring element (11, 31) acting on said actuating element, at least one latching element (9, 29) radially displaceable inwardly through said opening (3, 23) in said receiving sleeve into said receiving passageway (2, 22) by said actuating element (10, 30), an axially extending actuating sleeve (12, 32) laterally encircling and axially displaceable of said receiving sleeve and located outwardly of said actuating element, said actuating sleeve (12, 32) having a stop (14, 34) on an inside surface thereof and arranged to provide an axially directed force against said actuating element, and means (6, 13, 26, 33) for axially displaceably connecting said actuating sleeve to said receiving sleeve.

2. Tool bit chuck, as set forth in claim 1, wherein a damping element (15, 35) being disposed between said stop (14, 34) and said actuating element (10, 30).

3. Tool bit chuck, as set forth in claim 1 or 2, wherein said stop (14, 34) is shaped as an annular shoulder at the inside surface of said actuating sleeve (12, 32).

4. Tool bit chuck, as set forth in claim 3, wherein said stop (14) is located intermediate the ends of said actuating sleeve with said stop facing towards a mouth region of said receiving passageway.

5. Tool bit chuck, as set forth in claim 3, wherein said stop (34) is located in said actuating sleeve (32) at an end thereof opposite a mouth of said receiving passageway (23) with said stop facing towards the mouth of said receiving passageway (23).

6. Tool bit chuck, as set forth in claim 1 or 2, wherein said connecting means (6, 13; 26, 33) are formed as cooperating threads on said actuating sleeve (12, 32) and said receiving sleeve (1, 21).

7. Tool bit chuck, as set forth in claim 1 or 2, wherein said latching elements (9) are formed as pins.

8. Tool bit chuck, as set forth in claim 1 or 2, wherein said latching elements (29) are pawl-shaped.

* * * * *

UNITED STATES PATENT AND TRADEMARK OFFICE
CERTIFICATE OF CORRECTION

PATENT NO. : 5,709,393

DATED : January 20, 1998

INVENTOR(S) : Leopold von Keudell, et al

It is certified that error appears in the above-identified patent and that said Letters Patent is hereby corrected as shown below:

On the title page: Item [73]

Assignee: Hilti Aktiengesellschaft,
Schaan, Furstentum Liechtenstein

Signed and Sealed this

Twenty-eighth Day of April, 1998

Attest:

BRUCE LEHMAN

*Attesting Officer*  *Commissioner of Patents and Trademarks*